United States Patent [19]

Seo

[11] Patent Number: 6,124,947
[45] Date of Patent: Sep. 26, 2000

[54] TECHNIQUE FOR RETRANSMISSION OF UNCOMPLETED TRANSMISSIONS OF BROADCAST TRANSMISSIONS IN A FACSIMILE SYSTEM

[75] Inventor: Seok-Hwan Seo, Suwon, Rep. of Korea

[73] Assignee: SamSung Electronics Co., Ltd., Suwon, Rep. of Korea

[21] Appl. No.: 08/827,704

[22] Filed: Apr. 9, 1997

[30] Foreign Application Priority Data

Apr. 10, 1996 [KR] Rep. of Korea ................. 96-10812

[51] Int. Cl.⁷ ........................................... H04N 1/00
[52] U.S. Cl. ................................. 358/405; 358/440
[58] Field of Search ............................ 358/402, 407, 358/434, 440, 400, 403, 405, 437; 382/311

[56] References Cited

U.S. PATENT DOCUMENTS

| | | | |
|---|---|---|---|
| 4,566,039 | 1/1986 | Oya ........................................... | 358/280 |
| 5,095,373 | 3/1992 | Hisano ..................................... | 358/402 |
| 5,278,664 | 1/1994 | Jang ......................................... | 358/440 |
| 5,291,305 | 3/1994 | Sakashita et al. ....................... | 358/444 |
| 5,301,035 | 4/1994 | Hayafune ................................. | 358/440 |
| 5,363,206 | 11/1994 | Fukushima .............................. | 358/440 |
| 5,392,131 | 2/1995 | Umeno .................................... | 358/403 |
| 5,404,231 | 4/1995 | Bloomfield .............................. | 358/400 |
| 5,438,427 | 8/1995 | Yoshida ................................... | 358/405 |
| 5,459,584 | 10/1995 | Gordon et al. .......................... | 358/434 |
| 5,543,938 | 8/1996 | Fukushima .............................. | 358/407 |
| 5,555,100 | 9/1996 | Bloomfield et al. .................... | 358/402 |
| 5,585,854 | 12/1996 | Makino ................................... | 382/437 |
| 5,684,606 | 11/1997 | Yoshida ................................... | 358/437 |
| 5,757,511 | 5/1998 | Kaneyama ............................... | 358/403 |
| 5,872,638 | 2/1999 | Haze ....................................... | 358/405 |
| 5,896,204 | 4/1999 | Sato et al. ............................... | 358/405 |

FOREIGN PATENT DOCUMENTS

| | | | |
|---|---|---|---|
| 0666682 | 8/1995 | European Pat. Off. ....... | H04N 1/327 |
| 57-191784 | 11/1982 | Japan ................................ | 382/311 |

OTHER PUBLICATIONS

Cowart, *Mastering Windows™ 3.1: Special Edition*, published by SYBEX, Inc., San Francisco, CA, 1993, pp. 24–25, 52–53, 696–699 and 864–880.

*Primary Examiner*—Andrew W. Johns
*Attorney, Agent, or Firm*—Robert E. Bushnell, Esq.

[57] ABSTRACT

A device for broadcast transmission in a facsimile system includes: a memory; a control unit for storing the telephone number of a failed transmission in a broadcast transmission and other related data as transmission information in a certain area of the memory; a unit for informing a user of said transmission failure; and a unit for dialing and retransmitting to a corresponding telephone number based on the retransmission information in response to data of a certain key pressed by the user. A method for effecting the broadcast transmission in a facsimile system having a display and a pending job list stored in a memory includes the steps of: performing a broadcast transmission wherein broadcast telephone numbers are read and sequentially dialed, a message is transmitted upon a line connection and information of remaining pages is stored in a given area of the pending job list at the time of a transmission failure of the corresponding message; storing the telephone number of a failed transmission and other related data as the retransmission information in the given area of the pending job list when the corresponding message transmission fails; periodically checking the pending job list and displaying the retransmission information of the pending job list on the display; and returning to the step of broadcast transmission in order that the telephone number of a failed transmission is retransmitted according to a user's command responding to the display of the retransmission information.

9 Claims, 6 Drawing Sheets

| PENDING JOB NO | TRANSMISSION FAILURE TELEPHONE NO |
|---|---|
| 004 | 011-768-0045 |
| | 003-765-0068 |
| | 004-256-1234 |
| 006 | 001-2-765-4468 |
| | 002-4-755-6677 |

FIG. 4

| ENTRY OR NOT |
|---|
| FILE NO |
| GROUP ID |
| NUMBER OF TOTAL PAGES |
| TRANSMITTED PAGE 1 |
| TRANSMITTED PAGE 2 |
| ⋮ |
| TRANSMITTED PAGE N |

FIG. 5

| ENTRY NO | END LOCATION TELEPHONE NO | RETRY COUNTER | NUMBER OF TRANSMITTED PAGES | RESULT |
|---|---|---|---|---|
| 01 | 745-0084 | 2 | 10 | OK |
| 02 | 765-8845 | 0 | 8 | NG |
| 03 | 733-3466 | 0 | ⋮ | ⋮ |
| ⋮ | ⋮ | ⋮ | | |

FIG. 6

| USE OR NONUSE | JOB NO | FILE NO | INFORMATION |
|---|---|---|---|
| USE | 001 | 20 | INFORMATION 1 |
| USE | 003 | 40 | INFORMATION 2 |

| TELEPHONE NO | NUMBER OF TRANSMITTED PAGES | RESULT |
|---|---|---|
| 765-8845 | 8 | NG |
| 733-3466 | 0 | NG |
| ⋮ | ⋮ | ⋮ |

FIG. 7A   FIG. 7B

TECHNIQUE FOR RETRANSMISSION OF UNCOMPLETED TRANSMISSIONS OF BROADCAST TRANSMISSIONS IN A FACSIMILE SYSTEM

CLAIM OF PRIORITY

This application makes reference to, incorporates the same herein, and claims all benefits accruing under 35 U.S.C. §119 from an application for DEVICE AND METHOD FOR BROADCAST TRANSMISSION IN FACSIMILE SYSTEM earlier filed in the Korean Industrial Property Office on Apr. 10, 1996 and there duly assigned Serial No. 10812/1996.

BACKGROUND OF THE INVENTION

1. Field of the Invention

The present invention relates to a technique for broadcast transmission in a facsimile system and, more particularly, to a technique for automatically retransmitting a telephone number after a transmission failure in a broadcast transmission.

2. Description of the Related Art

The development of advanced scientific technology and the acceleration of industrialization require all kinds of office equipment to have more convenient and various functions for users. For this purpose, a broadcast transmission function provided in a facsimile system has been developed.

In a facsimile system for controlling a broadcast transmission, a control unit for controlling an overall operation of the facsimile system executes the following operations. When a broadcast transmission job is started according to a user's command, the control unit reads out broadcast transmission telephone numbers from a database. Various broadcast transmission telephone numbers can be entered in the broadcast transmission job or in respectively different actual telephone number databases. The control unit reads out a telephone number and an end location telephone number from the database. This end location telephone number is the last telephone number to be dialed and transmitted. The control unit dials a telephone number and after being dialed, a determination is made as to whether or not there is a response in the facsimile system from a receiving party. If there is no response, a determination is made as to whether or not the telephone number corresponds to the last telephone number of the broadcast transmission. If there is a next telephone number, an index of the next telephone number is designated and then the system returns to the step of reading a telephone number. On the other hand, if there is a response, a message previously stored in a data memory is transmitted to the facsimile of the receiving part. This message may be composed of multiple pages. A determination is then made as to whether or not the transmission has successfully been completed. If an error has been generated during the transmission of the multiple pages, information of the remaining page or pages are stored in the memory. This information is used for the pages to be retransmitted at the time of the next redialing. The procedure then goes to the previously noted step of determining whether or not the telephone number corresponds to the last telephone number of the broadcast transmission.

In the meantime, if the telephone number corresponds to the last telephone number of the broadcast transmission, a determination is made as to whether or not the transmission has successfully been completed. If the transmission has failed, a determination is made as to whether or not a predetermined retry counter number value has been exceeded. If not exceeded, one is added to the retry counter number value and the operation returns to the step of reading the telephone number from the database. On the contrary, if the predetermined retry counter number value has been exceeded, a report of the broadcast transmission failure is outputted. The report includes the information of the failed telephone number, the job number, and the number of pages transmitted, which is stored in the memory. At this time, the user must reset and perform the broadcast transmission for the failed telephone number.

As mentioned above, the broadcast transmission is once finished by printing the successful telephone number, the failed telephone number and the number of each page. Then, the user has to identify the report and then again perform the procedure of setting the broadcast transmission or individual transmission job. Therefore, when there are a lot of telephone numbers and pages to be transmitted, there is a problem occasioning inconvenience to its user since a great deal of time and labor is required. Moreover, when some pages of the total number of pages are selectively required to be transmitted, there is another problem where such a retry job is impossible. There is another problem in that some already transmitted pages may be transmitted again, thereby causing its user to pay a wasteful correspondence fee.

The following patents each disclose features of the present invention but do not teach or disclose the specifically recited combination constituting the present invention.

U.S. Pat. No. 5,543,938 to Fukushima, entitled *Facsimile Apparatus And Method For Transmitting Information To A Plurality Of Destinations,* U.S. Pat. No. 5,555,100 to Bloomfield et al., entitled *Facsimile Store And Forward System With Local Interface Translating DTMF Signals Into Store And Forward System Commands,* U.S. Pat. No. 5,585,854 to Makino, entitled *Data Communication Apparatus For Multi-Address Transmission Which Directly Transmits To The Destination Station Upon Detecting Non-Delivery Status,* U.S. Pat. No. 5,363,206 to Fukushima, entitled *Facsimile Apparatus Capable Of Re-Transmitting The Same Image Data,* U.S. Pat. No. 5,404,231 to Bloomfield, entitled *Sender-Based Facsimile Store And Forward Facility,* U.S. Pat. No. 5,459,584 to Gordon et al., entitled *Facsimile Telecommunications System And Method,* U.S. Pat. No. 5,095,373 to Hisano, entitled *Facsimile Machine Having Store And Forward Mode,* U.S. Pat. No. 5,278,664 to Jang, entitled *Method For Increasing Communication Efficiency In A Multiport Facsimile,* U.S. Pat. No. 5,291,305 to Sakashita et al., entitled *Facsimile Network System Capable Of Carrying Out Broadcast Communication,* U.S. Pat. No. 5,301,035 to Hayafune, entitled *Facsimile Apparatus Having Redialing Function,* and U.S. Pat. No. 5,392,131 to Umeno, entitled *Facsimile Machine Having Function Of Retrieving Stored Documents Waiting For Transmission.*

SUMMARY OF THE INVENTION

Therefore, it is an object of the present to provide a technique for automatically performing a retransmission to a corresponding telephone number according to a user's command, as well as storing the telephone number of a failed transmission in a broadcast transmission and notifying the user of the stored telephone number.

In order to accomplish the above objects, there is provided a device for the broadcast transmission in the facsimile system including: a memory; a control unit for storing the telephone number of a failed transmission in a broadcast transmission and other related data as transmission information in a certain area of the memory; a unit for informing a user of said transmission failure; and a unit for dialing and retransmitting a corresponding telephone number based on the retransmission information in response to data of a certain pressed key.

Also provided is a method for broadcast transmission in a facsimile system having a display unit and a pending job list stored in a memory, comprising the steps of: performing a broadcast transmission wherein broadcast telephone numbers are read and sequentially dialed, a message being transmitted upon a line connection and information of remaining pages being stored in a given area of the pending job list at the time of a transmission failure of the corresponding message; storing the telephone number of a failed transmission in the transmission and other related data as retransmission information in the given area of the pending job list when the corresponding message transmission has failed; periodically checking the pending job list and displaying the retransmission information of the pending job list on the display unit; returning to the step of performing the broadcast transmission in order that the telephone number of a failed transmission in the transmission is retransmitted according to a user's command in response to the display of the retransmission information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a view illustrating an output state of a broadcast transmission failure information list in the facsimile system according to the present invention;

FIG. 5 is a view illustrating a structure of a broadcast job table according to the present invention;

FIG. 6 is a view illustrating a structure of the broadcast information table according to the present invention; and FIGS. 7A and 7B are views illustrating structures of a pending job area and an information area according to the present invention.

DETAILED DESCRIPTION OF THE PREFERRED EMBODIMENT

Figure 2:
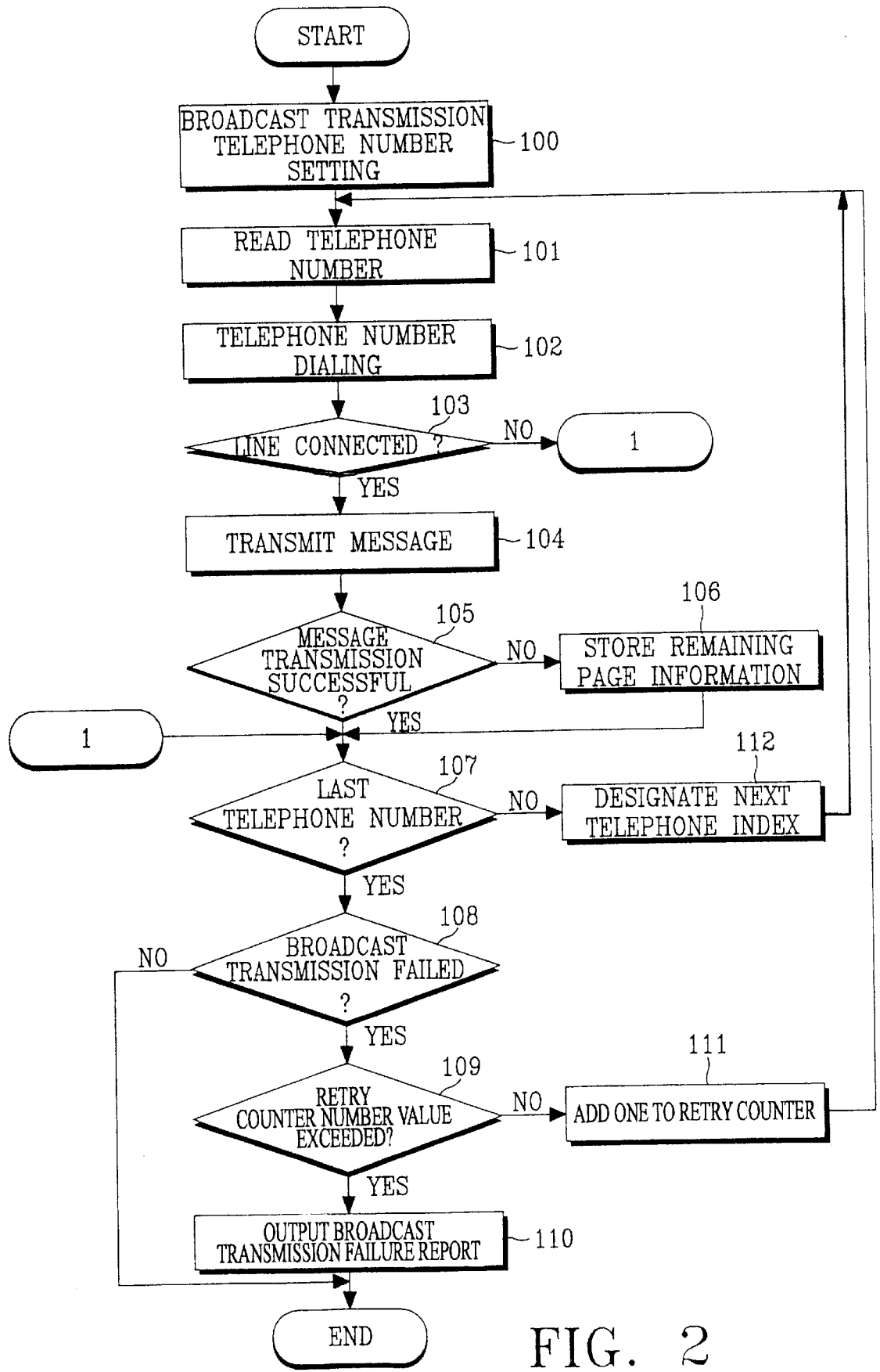
FIG. 2 is a flowchart illustrating a procedure of controlling a broadcast transmission in a facsimile system.

FIG. 2 is a flow chart showing a procedure of controlling a broadcast transmission in facsimile system. In such a facsimile system, a control unit (e.g., a microprocessor) for controlling an overall operation of the facsimile system executes the following operations. That is, when a broadcast transmission job is started according to a user's command, the control unit reads out broadcast transmission telephone numbers from a database in step 100. Various broadcast transmission telephone numbers can be entered in the broadcast transmission job or in respectively different actual telephone number databases. The control unit reads out a telephone number and an end location telephone number from the database in step 101. This end location telephone number is the last telephone number to be dialed and transmitted. The control unit dials a telephone number in step 102. After being dialed, a determination is made as to whether or not there is a response in the facsimile system from a receiving party (that is, the line connection is completed) in step 103. If there is no response, the control unit proceeds to step 107. On the contrary, if there is a response (that is, the line connection is successfully completed), a message previously stored in a data memory is transmitted to the facsimile system of the receiving part in step 104. This message may be composed of multiple pages. In step 105, a determination is made as to whether or not the transmission has successfully been completed. If an error has been generated during transmission of the multiple pages, information of the remaining page or pages is stored in the memory in step 106. This information is used for referring to pages to be retransmitted at the time of the next redialing. In step 107, a determination is made as to whether or not the telephone number corresponds to the last telephone number of the broadcast transmission. If there is a next telephone number, an index of the next telephone number is designated in step 112 and then the step 101 is executed again.

In the meantime, if the telephone number corresponds to the last telephone number of the broadcast transmission in the step 107, a determination is made as to whether or not the transmission has successfully been completed in step 108. If the transmission has failed, a determination is made as to whether or not a predetermined retry counter number value has been exceeded in step 109. If not exceeded, one is added to the retry counter number value in step 111 and then step 101 is executed again. On the contrary, if the predetermined retry counter number value has been exceeded, a report of the broadcast transmission failure is outputted in step 110. The report includes the information of the failed telephone number, the job number and the number of pages transmitted, which is stored in the memory. At this time, the user must reset and perform the broadcast transmission for the failed telephone number.

Hereinafter, a preferred detailed embodiment of the present invention will be explained with the accompanying drawings.

Throughout the drawings, it should be noted that the same reference numerals will be used to designate the same or equivalent elements having the same function. Further, in the following description, plural specific details such as concrete components composing the circuit, are set forth to provide a more thorough understanding of the present invention. It will be apparent, however, to one skilled in the art that the present invention may be practiced without these specific details. A detailed description on known functions and constructions unnecessarily obscuring the subject matter of the present invention has been avoided in the present application.

Figure 1:
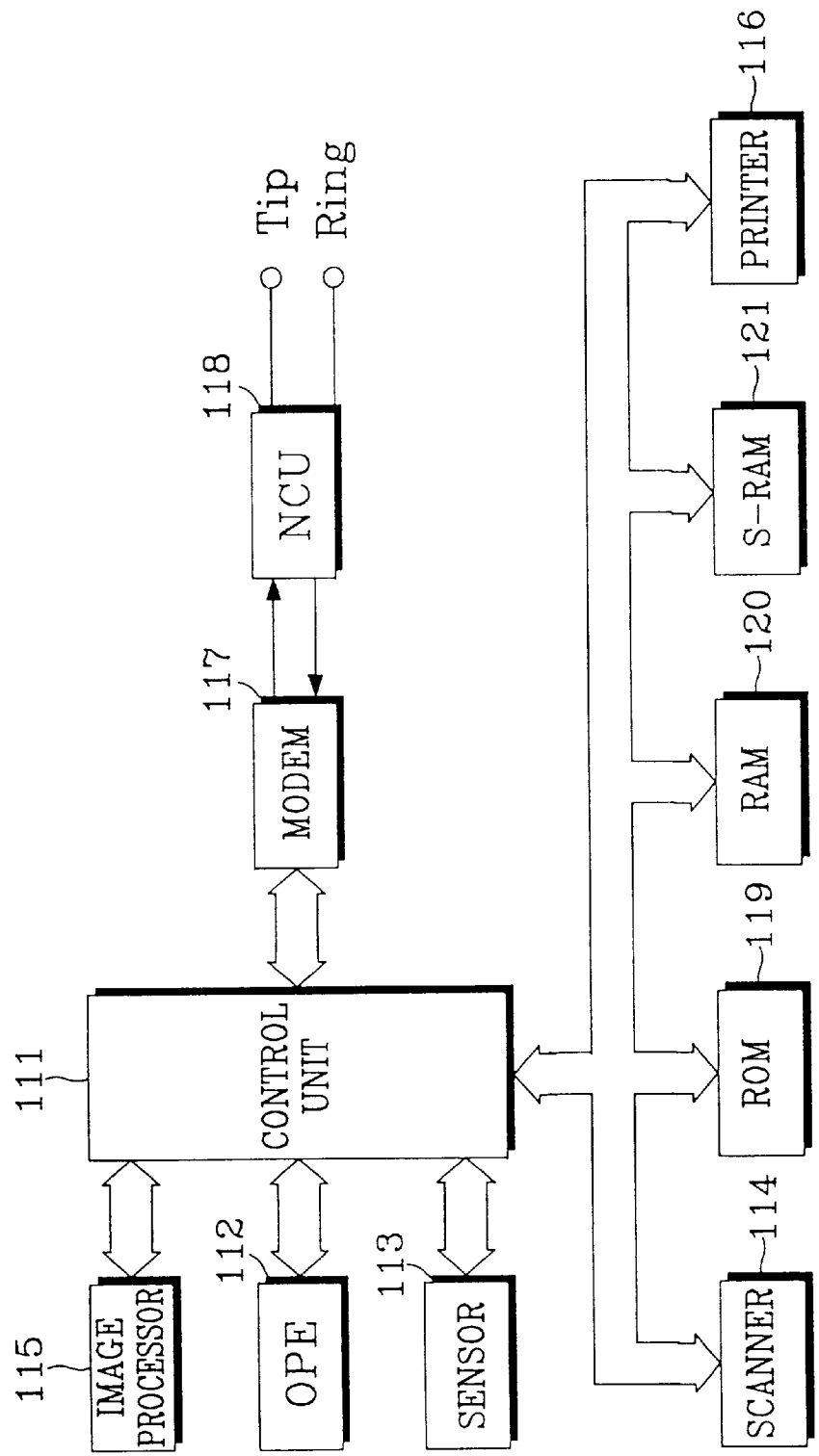
FIG. 1 is a block diagram illustrating a structure of a facsimile system according to the present invention.

FIG. 1 is a block diagram illustrating a structure of a facsimile system according to the present invention. A control unit 111 controls the overall operation of a transmission mode and a receiving mode and a copying mode in the facsimile system according to a predetermined program. Also, the control unit 111 is provided with a program memory and a data memory and a back-up memory, or is connected to external elements 119 to 121. A read-only memory (ROM) 119, used as the program memory, stores the program according to the present invention, and a random access memory (RAM) 120, used as the data memory, temporarily stores data generated during the execution of the program. That is, the data memory stores a broadcast job table, a broadcast information table, a pending job area and an information area according to the present invention. Also, a static read only memory (S-RAM) 121, used as the back-up memory, is provided. An operating panel (OPE) 112 consists of a key input unit and a display unit. The key input unit of the OPE 112 generates data for each key pressed for designating each mode and performing an operation of the designated mode, and outputs the generated data to the control unit 111. Also, the display unit of the OPE 112 inputs display data for displaying an operation status of the facsimile system and displays the inputted display data, while each mode is being performed. A sensor 113 checks whether or not a document is inputted and whether or not there is print paper. The sensed status signal of the sensor 113 is outputted to the control unit 111. A scanner 114 scans an image of the inputted document as the inputted document is moved, and outputs the image of the inputted document. An image processor 115 converts an image signal outputted from the scanner 114 into digital data, and outputs the converted digital data. A printer 116 prints out the image data inputted from the image processor 115 on the print paper while the receiving mode and the copying mode are being performed under the control of the control unit 111. At the time of the transmission mode under the control of the control unit 111, a modulator-demodulator (MODEM) 117 modulates the image data outputted from the image processor 115 into the image data of the transmission format, that is, the standard format of the facsimile system, and then transmits the modulated image data to a network control unit (NCU) 118. When in the receiving mode, the MODEM 117 demodulates the encoded image signal inputted through a transmission line into a format making it possible for it to be processed in the image processor 115. The NCU 118 connects the telephone line (Tip and Ring lines) to the MODEM 117 under the control of the control unit 111.

Figure 3A:
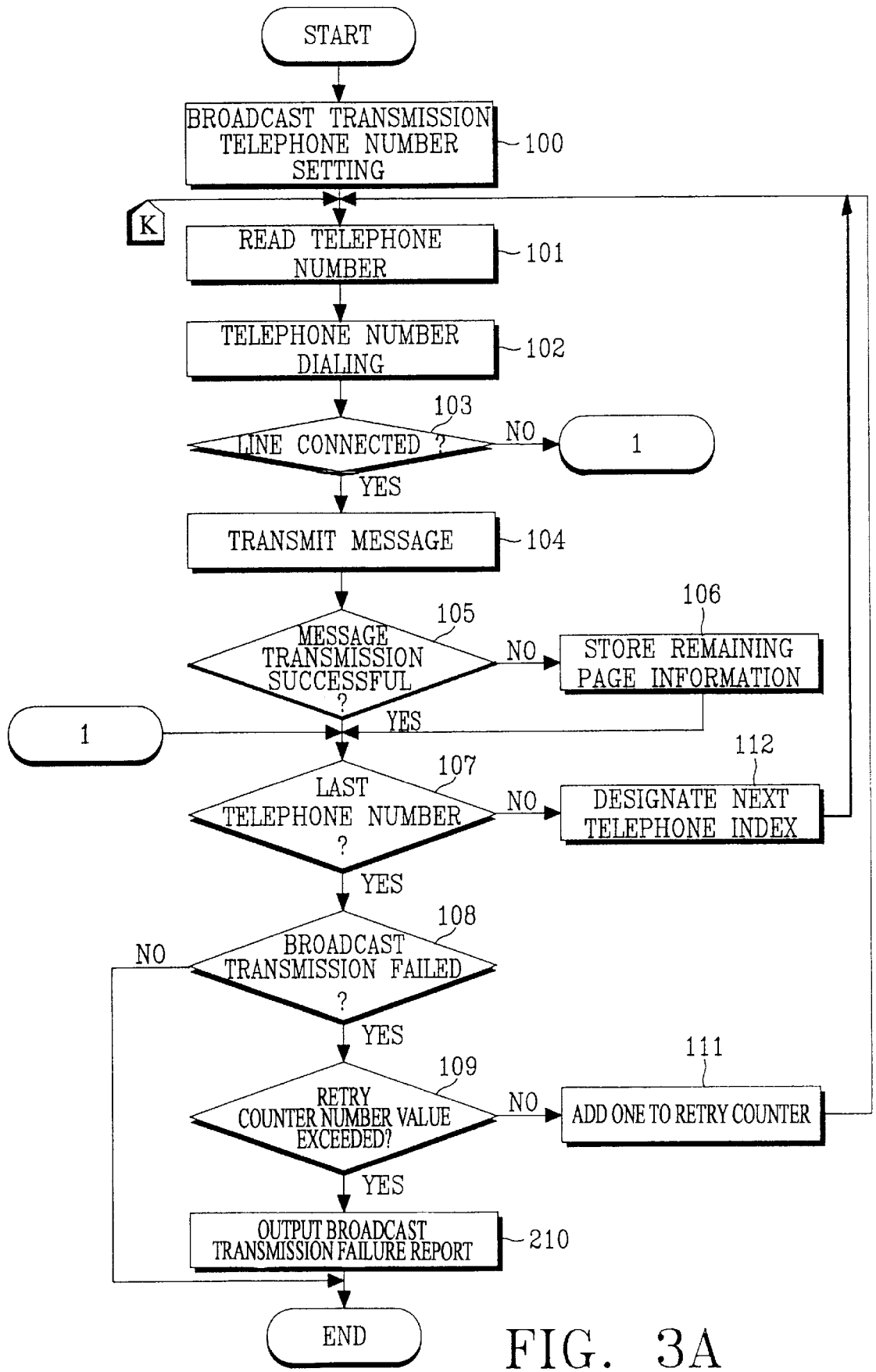
FIGS. 3A and 3B are flowcharts illustrating a procedure of controlling a broadcast transmission in the facsimile system according to the present invention.
Figure 3B:
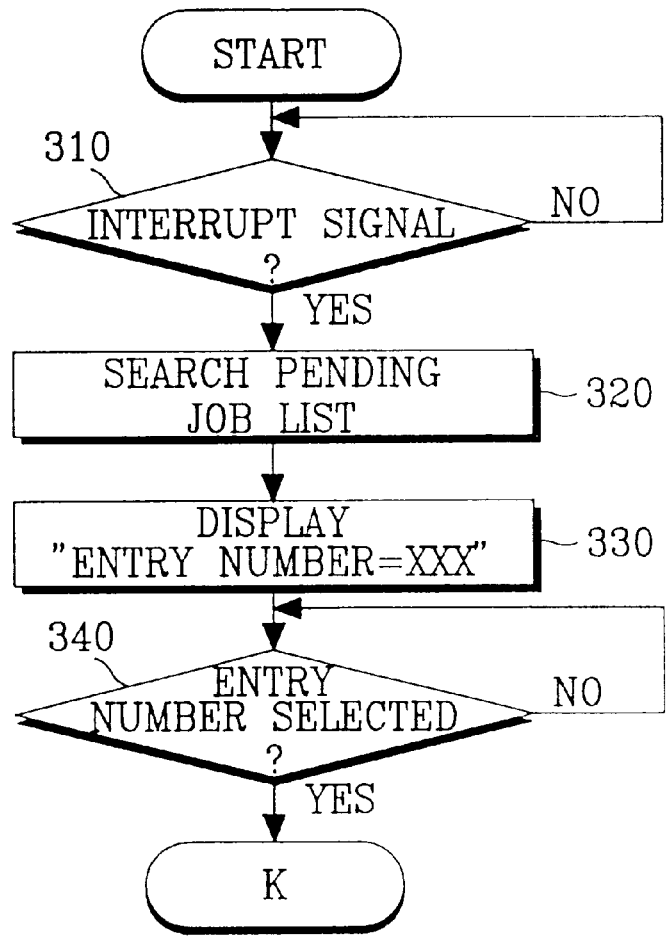

FIGS. 3A and 3B are flowcharts illustrating a procedure of controlling the broadcast transmission in the facsimile system according to the present invention. Steps 100 to 109, and step 111 and step 112 are the same as those of FIG. 2. The main subject matter of the present invention is to record the failure information on the pending job list in step 210 in the case that the retry counter number value is exceeded in step 109.

If the transmission fails even after the retransmission is performed as many times as the predetermined retry counter number value in the step 109 of FIG. 3A, then the failure telephone number, the job number and the number of pages transmitted are stored in the S-RAM 121, in step 210.

On the other hand, when an interrupt signal is generated in step 310 of FIG. 3B, a determination is made as to whether or not there is the pending transmission failure job by searching the pending job list in the step 320. If there is a pending job, a redial group is displayed on a liquid crystal display (LCD) of the OPE 112, such as the message "entry number=XXX" in step 330. And then, when the user confirms the entry number to be redialed by a selection key in step 340, then, the procedure of FIG. 3B returns to the step 101 of FIG. 3A.

Also, when the user cancels the pending transmission failure job currently pending, a message such as "cancel pending failure job=XXX" is displayed in the same manner as mentioned above so that it can be confirmed by the user. And then, if the user confirms the message by inputting a given key, the message "used" is changed into "unused" in the pending job area.

FIG. 4 is a view illustrating an output state of the broadcast transmission failure job list in the facsimile system according to the present invention. The broadcast transmission failure job list is printed out when the user desires to confirm how many pending transmission failure jobs there are. The failure job list includes the pending job number and the transmission failure telephone number or numbers. In addition, the remaining page number per each transmission failure telephone number is recorded on the failure job list so that the user can confirm the remaining page number. In the case of the rear failure page, the successful page is canceled from the data area of the memory, thereby reducing the needed capacity of the memory.

FIG. 5 is a view illustrating a structure of the broadcast job table according to the present invention. The broadcast job table is a control area used for the broadcast transmission. Whether or not there is an entry shows whether or not the broadcast transmission job has been set. A file number indicates an index for data stored in the memory. A group identification is a reference identification of the broadcast transmission job. Total page numbers indicate the number of total pages of data stored in the memory.

FIG. 6 is a view illustrating a structure of the broadcast information table according to the present invention. The broadcast information table is an information area assigned to each telephone number in preparation for an actual transmission. Herein, "entry number" indicates a serial number of the actual telephone number, and "end location telephone number" indicates the telephone number actually transmitted. "Retry counter" indicates the number of times dialed as many as an entry counter set in the system database. And, in the case that the transmission is completed as many as the number of total pages, the message "OK" is displayed, and otherwise the message "NG" is displayed in an area of "result".

FIGS. 7A and 7B are views illustrating the structures of the pending job area and information area according to the present invention. When the broadcast transmission is finished and the broadcast information table as shown in the FIG. 6 is provided, the broadcast information table is copied into the pending job area. The pending job area includes an use or nonuse area, a job number area, a file number area and an information area. The information area is again recorded only when the area of "result" has the message "NG" displayed in the broadcast information table.

The present invention detailed as above has advantages in that the telephone number in a broadcast transmission failure is automatically stored and the stored telephone number is visually reported to a user and simultaneously, a retransmission to the corresponding telephone number is automatically performed according to the user's command. Also, the present invention has another advantage in that the telephone number required by the user is transmitted without an error.

While there have been illustrated and described what are considered to be preferred embodiments of the present invention, it will be understood by those skilled in the art that various changes and modifications may be made, and equivalents may be substituted for elements thereof without departing from the true scope of the present invention.

What is claimed is:

1. A device for a broadcast transmission in a facsimile system, comprising:

a memory having a given area for storing a pending job list for a broadcast transmission;

a control unit for storing a telephone number of a failed transmission in a broadcast transmission and other related data as retransmission information in said given area of said memory for storing said pending job list, said retransmission information including data of any remaining page of said failed transmission;

a unit for informing a user of said failed transmission; and a unit for dialing and retransmitting any remaining page of said failed transmission to a corresponding telephone number based on said retransmission information in response to data of a certain key pressed by the user.

2. The device as claimed in claim 1, further comprised of:

said unit for informing a user of said failed transmission comprising:
    a display for displaying said retransmission information on a display screen; and
    a printer for printing said retransmission information on print paper.

3. The device as claimed in claim 2, further comprised of:

said control unit, upon receiving an interrupt during a certain time interval, accessing said given area of said memory for storing said pending job list and searching for said retransmission information.

4. The device as claimed in claim 1, further comprised of:

said control unit, upon receiving an interrupt during a certain time interval, accessing said given area of said memory for storing said pending job list and searching for said retransmission information.

5. A method for effecting a broadcast transmission in a facsimile system having a display and a pending job list stored in a memory, comprising the steps of:

providing a memory for said facsimile system;

storing a pending job list for a broadcast transmission in said memory;

performing a broadcast transmission wherein broadcast telephone numbers are read and sequentially dialed;

transmitting a corresponding message to a corresponding one of said sequentially dialed broadcast telephone numbers upon a line connection;

storing information of any remaining page of said corresponding message in a given area of said pending job list as retransmission information at a time of a failed transmission of said corresponding message to said corresponding one of said broadcast telephone numbers;

storing said corresponding one of said broadcast telephone numbers and other related data of said failed transmission as retransmission information in said given area of said pending job list when transmission of said corresponding message fails;

periodically checking said pending job list and displaying said retransmission information stored in said given area of said pending job list on the display; and returning to said step of performing said broadcast transmission in order that any said corresponding message to a corresponding one of said broadcast telephone numbers of a corresponding said failed transmission is selectively retransmitted according to a user's command in response to said display of said retransmission information.

6. The method as claimed in claim 5 further comprising:

repeatedly performing said broadcast transmission until a predetermined retry counter number value is exceeded when it has been determined that said broadcast transmission has failed.

7. The method as claimed in claim 5, further comprising the step of when receiving an interrupt during a certain time interval, accessing said memory and searching for said retransmission information stored in said given area of said pending job list in said memory.

8. The method as claimed in claim 7, further comprising the step of printing using a printer said retransmission information on print paper.

9. The method as claimed in claim 5, further comprising the step of printing using a printer said retransmission information on print paper.

\* \* \* \* \*